United States Patent
Ström et al.

(10) Patent No.: US 11,866,371 B2
(45) Date of Patent: Jan. 9, 2024

(54) HEATING ELEMENT COMPRISING CHROMIUM ALLOYED MOLYBDENUM DISILICIDE AND THE USE THEREOF

(71) Applicant: Sandvik Intellectual Property AB, Sandviken (SE)

(72) Inventors: Erik Ström, Västerås (SE); Petter Lindblom, Hallstahammar (SE)

(73) Assignee: Sandvik Intellectual Property AB, Sandviken (SE)

( * ) Notice: Subject to any disclaimer, the term of this patent is extended or adjusted under 35 U.S.C. 154(b) by 671 days.

(21) Appl. No.: 16/981,311

(22) PCT Filed: Mar. 15, 2019

(86) PCT No.: PCT/EP2019/056631
§ 371 (c)(1),
(2) Date: Sep. 16, 2020

(87) PCT Pub. No.: WO2019/179904
PCT Pub. Date: Sep. 26, 2019

(65) Prior Publication Data
US 2021/0009474 A1    Jan. 14, 2021

(30) Foreign Application Priority Data
Mar. 18, 2018 (WO) ................ PCT/EP2018/056778

(51) Int. Cl.
*H05B 3/14* (2006.01)
*C04B 35/58* (2006.01)
(Continued)

(52) U.S. Cl.
CPC .... *C04B 35/58092* (2013.01); *C04B 35/6261* (2013.01); *C04B 35/64* (2013.01);
(Continued)

(58) Field of Classification Search
CPC .... H05B 3/14; H05B 3/148; C04B 35/58092; C04B 35/547
See application file for complete search history.

(56) References Cited

U.S. PATENT DOCUMENTS 2,779,579 A     1/1957  Steinitz
2011/0240911 A1* 10/2011 Sundberg .......... C04B 35/58092
                                                    252/71

FOREIGN PATENT DOCUMENTS

EP      3200558 B1    5/2019
JP      2002-348174 A  12/2002
(Continued)

OTHER PUBLICATIONS

International Search Report and Written Opinion dated Jun. 13, 2019, issued in corresponding International Patent Application No. PCT/EP2019/056631.
(Continued)

*Primary Examiner* — Khanh T Nguyen
(74) *Attorney, Agent, or Firm* — Morgan, Lewis & Bockius LLP

(57) ABSTRACT

The present disclosure relates to a heating element, wherein at least one part of the heating element is manufactured from a molybdenum disilicide composition and wherein in the molybdenum disilicide composition, molybdenum is substituted by chromium according to $(Mo_{1-x}Cr_x)Si_2$ and x is in the range of $0.16 \leq x \leq 0.19$.

10 Claims, 3 Drawing Sheets

(51) Int. Cl.
*C04B 35/626* (2006.01)
*C04B 35/64* (2006.01)
*F27D 11/04* (2006.01)

(52) U.S. Cl.
CPC ............ *F27D 11/04* (2013.01); *H05B 3/148* (2013.01); *C04B 2235/349* (2013.01); *C04B 2235/3891* (2013.01); *C04B 2235/656* (2013.01)

(56) References Cited

FOREIGN PATENT DOCUMENTS

| JP | 2004-307243 A | 11/2004 |
| JP | 2015-195186 A | 11/2015 |
| JP | 2017-134968 A | 8/2017 |
| WO | 2010/047654 A1 | 4/2010 |
| WO | 2017/108694 A1 | 6/2017 |
| WO | WO 2017/108694 A1 * | 6/2017 ............. C04B 35/58 |

OTHER PUBLICATIONS

Office Action dated Apr. 27, 2021, issued in corresponding Japanese Patent Application No. 2020-548907.

Xu et al., "Enhanced corrosion-resistance in nanocrystalline MoSi2 films enabled by Cr additions", Surface & Coatings Technology, 206 (2012) pp. 4947-4951.

Xu et al., "Mechanical properties of Cr-alloyed MoSi2-based nanocomposite coatings with a hierarchical structure", Jornal of Alloys and Compounds, 565 (2013) pp. 127-133.

Ström et al. in "Low temperature oxidation of Cr-alloyed MoSi2", Transaction of Nonferrous Metals Society of China, 2007: 17(6) 1282-1286.

* cited by examiner

HEATING ELEMENT COMPRISING CHROMIUM ALLOYED MOLYBDENUM DISILICIDE AND THE USE THEREOF

TECHNICAL FIELD

The present disclosure relates to a heating element composed at least two parts which are based on different molybdenum disilicide-based compositions, wherein at least one of the molybdenum disilicide-based parts is based on a molybdenum disilicide composition in which part of the molybdenum is substituted by chromium according to $(Mo_{1-x}Cr_x)Si_2$ and x is in the range of from $0.16 \leq x \leq 0.19$ and wherein at least one part of the heating element is based on another molybdenum disilicide-based composition. The present disclosure also relates to the use of said heating element and to a furnace comprising said heating element.

BACKGROUND

Molybdenum disilicide based materials have successfully been used in many demanding high temperature applications, such as in parts in engines, turbines and furnaces. These materials typically exhibit good mechanical properties at high temperatures, up to 1800° C., as well as good corrosion and oxidation resistance in air, mainly owing to the formation of a continuous and well-adherent $SiO_2$ layer protecting the molybdenum disilicide.

However, heating of molybdenum disilicide based materials in air also leads to the formation of $MoO_3$ which, especially in the temperature range of 400-600° C., will disturb the formation of a continuous and well-adherent $SiO_2$ layer on the molybdenum disilicide based material. This phenomenon was first described and termed "pesting" by Fitzer in 1955. Since pesting hinders the formation of a protective silica layer, material consumption due to oxidation and corrosion will be both high and continuous where pesting has occurred. In a high temperature application, such as a furnace, at least part of the heating elements used therein will be in the pesting temperature regime.

It has been shown by for example Ström et al. in "Low temperature oxidation of Cr-alloyed $MoSi_2$", Transaction of Nonferrous Metals Society of China, 2007: 17(6) 1282-1286 that chromium alloyed molybdenum disilicide compositions such as $(Mo_{0.90}Cr_{0.10})Si_2$ and $(Mo_{0.85}Cr_{0.15})Si_2$ display an improved resistance towards pesting compared to pure $MoSi_2$.

However, there still exists a need for new heating elements comprising a molybdenum disilicide based materials which will provide an improved oxidation resistance.

SUMMARY

One aspect of the present disclosure is to provide a heating element which will solve or at least reduce the above-mentioned problems and/or needs.

The present disclosure therefore relates to a heating element composed of at least two molybdenum disilicide-based parts,
wherein at least one part is based on a molybdenum disilicide composition comprising more than 90 weight % of $(Mo_{1-x}Cr_x)Si_2$ and wherein x is in the range of from $0.16 \leq x \leq 0.19$;
and
wherein at least one part is based on a molybdenum disilicide composition comprising
a) more than or equal to 90 weight % $MoSi_2$, balance is aluminosilicate and/or $SiO_2$ or
b) more than or equal to 90 weight % $(Mo,W)Si_2$, balance is aluminosilicate and/or $SiO_2$.

The present heating element will thereby have an improved resistance towards pesting combined with good mechanical properties. Further, the present heating element will have high oxidation and corrosion resistance as well as good and reproducible mechanical properties and excellent high temperature performance and will be suitable for high temperature applications.

The heating element may be readily produced in various shapes and sizes and advantageously replace existing heating elements. Suitable applications include, but are not limited to, heating arrangements for heating above 900° C.

The different parts of the heating element may be formed into rod or other forms and then connected. Furthermore, the parts may be shaped as U-elements but also as multi-shank, helical, diffusion cassettes, flat panels, etc. The different parts may thus be in the form of rods and may be bended or straight depending on the intended use of the heating element. The cross-section of the rod may typically be circular, but depending on the application, other geometrical shapes may also be possible such as elliptical or rectangular.

DETAILED DESCRIPTION

Figure 1:
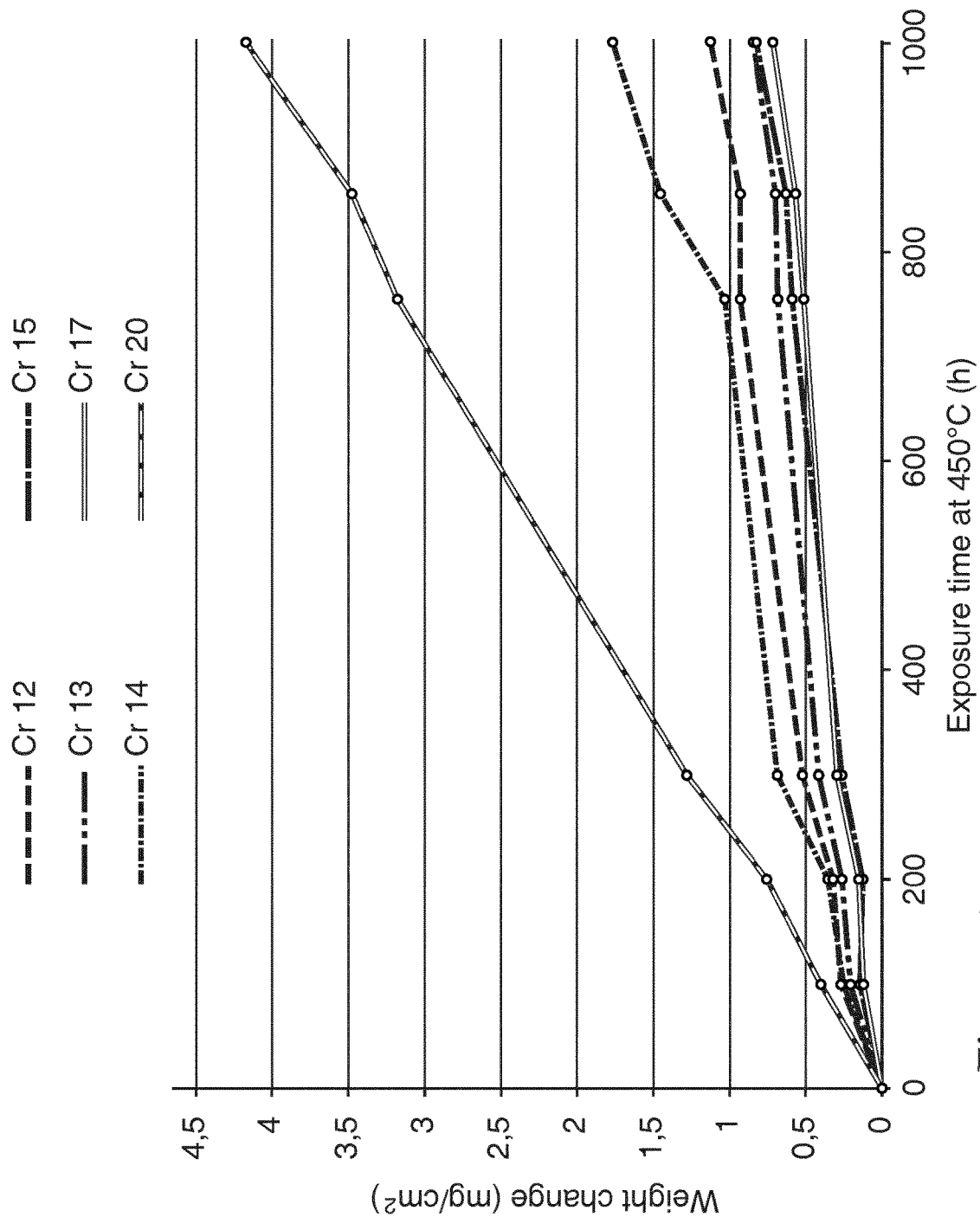
FIG. 1 shows a graph illustrating the weight gain of different samples as a function of exposure time at 450° C.

The present disclosure relates to a heating element composed of at least two molybdenum disilicide-based parts,
wherein at least one part is based on a molybdenum disilicide composition comprising more than 90 weight % of $(Mo_{1-x}Cr_x)Si_2$ and wherein x is in the range of from $0.16 \leq x \leq 0.19$;
and wherein at least one part is based on a molybdenum disilicide composition comprising
a) more than or equal to 90 weight % $MoSi_2$ balance is aluminosilicate and/or $SiO_2$ or
b) more than or equal to 90 weight % $(Mo,W)Si_2$ balance is aluminosilicate and/or $SiO_2$.

The range of chromium is of from $0.16 \leq x \leq 0.19$, such as $0.16 \leq x \leq 0.18$, such as $0.165 \leq x \leq 0.175$. This particular range of Cr has been found to further improve the oxidation resistance of the heating elements and will alleviate the problems associated with pesting.

The present heating element is composed of at least one part which is based on one molybdenum disilicide-based composition and at least one part which is based on another molybdenum disilicide-based composition. As the parts will have different properties due to the composition on which they are based on, the heating element will also have different properties at different portions.

The part(s) of the heating element, which will be exposed to the cold zones (400 to 600° C.), of a furnace is based on the molybdenum disilicide-based composition comprising more than or equal to 90 wt % of $(Mo_{1-x}Cr_x)Si_2$ wherein x is of from 0.16 to 0.19. The balance of the composition may be aluminosilicate clay and/or one or more inorganic oxides, such as $SiO_2$. According to one embodiment, the aluminosilicate clay is of the montmorillonite type for example bentonite. It has been showed that a chromium alloyed molybdenum disilicide-based composition will not form molybdenum oxides in the cold zones, which means that the silica dioxide layer formed will be continuous and therefore will not be exposed to degradation due to corrosion and/or wear. The part based on the composition comprising $(Mo_{1-x}Cr_x)Si_2$ may expand over to the hot zone(s) of the heating element and the part based on the composition comprising $(Mo,Al)Si_2$ may expand over in the cold zones of the heating element.

In the present disclosure, the terms "(Mo,Cr)Si$_2$-based material" and "$(Mo_{1-x}Cr_x)Si_2$" and "a chromium-alloyed based molybdenum disilicide" and "chromium-alloyed molybdenum disilicide-based composition" are used interchangeably.

Furthermore, the part(s) of the heating element exposed to the heat zones (i.e. above 600° C.) is (are) based on (manufactured from) a molybdenum disilicide based composition comprising more than or equal to 90 weight % of composition a) or b).

According to one embodiment, the chromium alloyed molybdenum disilicide composition comprising from 95 weight % $(Mo_{1-x}Cr_x)Si_2$. According to another embodiment, the balance of the chromium alloyed molybdenum disilicide composition may be aluminosilicate clay and/or one or more inorganic oxides, such as $SiO_2$. According to one embodiment, the aluminosilicate clay is of the montmorillonite type for example bentonite. and the balance is 10 weight % or less bentonite and/or at least one inorganic oxide.

According to one embodiment, compositions a) and b) may be used in the same part of the heating element, i.e. the heating element may, besides the part(s) based on $(Mo_{1-x}Cr_x)Si_2$, also comprise one or more parts based on both molybdenum disilicide compositions a) and b).

The different parts of the heating element may either be joined (connected) directly to each other or they may be joined by using another part which will function as an intermediate material that can alleviate e.g. differences in thermal expansion coefficient of the different parts. The parts of a heating element may be joined by using welding, such as diffusion welding or using by induction heating and then subsequently applying an external pressure perpendicular to the joint. An alternative is to pass an electrical current through the joint and then simultaneously apply external pressure perpendicular to the joint.

A typical heating element is a two-shank U-shaped element, with a heating zone of the heating material of one diameter welded to terminals of another diameter.

According to one embodiment, the heating element as defined hereinabove or hereinafter comprises or consists of two parts of different molybdenum disilicide-based compositions. According to another embodiment, the heating element as defined hereinabove or hereinafter comprises or consists of three parts, wherein two of the parts are composed of the same molybdenum disilicide-based composition. According to another embodiment, the heating element as defined hereinabove or hereinafter comprises or consists of four molybdenum disilicide-based parts wherein two parts are based on the chromium alloyed molybdenum disilicide composition as defined hereinabove or hereinafter. According to another embodiment, the heating element comprises or consist of two parts based on the $(Mo_{1-x}Cr_x)Si_2$ molybdenum disilicide-based composition and one part based on the (Mo,Al) based composition.

Referring to the drawings, a heating element comprises a section known as terminal(s) (see FIG. 1). The cold zone is located in this section. According to the present disclosure, the terminal is based on the part comprising the chromium alloyed molybdenum disilicide-based composition but a small section of the terminal could also be made from the material to be used in the hot zone. The heat zone section is preferably manufactured from the other molybdenium disilicide composition. The terminal may have a larger diameter than the heating zone. The terminal may also be adapted to extend to the outside of the furnace through the furnace wall and to be electrically connected on the outside of the furnace.

FIG. 1 illustrates examples of a heating element according to the present disclosure. FIG. 1 discloses a heating element 1. The heating element 1 has terminals 2. Parts 3 of the terminals are composed of chromium alloyed molybdenum disilicide composition and a part is composed of a molybdenum disilicide-based composition suitable for hot zone 4.

According to one embodiment, the part(s) based on the (Mo,Cr)Si$_2$-based material is (are) long enough to cover the zone(s) having a temperature range of 400-600° C. during operation. According to one embodiment, said part(s) is (are) in the form of a rod having a diameter of 1 to 30 mm and a length of 1 to 40 cm.

In the present description, the expression "the part is based on a composition" is intended to mean that at least 70 weight % of the part is based on that composition.

The present disclosure is further illustrated by the following non-limiting example.

Example

Elemental powders of molybdenum, silicon and chromium were mixed and heated in argon gas to form $(Mo_{1-x}Cr_x)Si_2$. The amount of Mo, Cr and Si depended on the value of x. The obtained product (could be described as a cake) $(Mo_{1-x}Cr_x)Si_2$ was crushed and milled to an average particle size of 5 μm, followed by cold isostatic pressing at 2000 bar in rubber moulds to form cylindrical green bodies. The green bodies were sintered in argon for 1 hour at 1550-1600° C.

Several samples with varying chromium content were prepared according to the method described above and their oxidation resistance was investigated at 450° C. in air and compared with a reference sample of pure $MoSi_2$ as well as samples having both lower and higher amounts of chromium. Table 1 summarizes the samples used.

TABLE 1

Investigated samples

| Material | Denotation in Figures | Sample type |
| --- | --- | --- |
| $MoSi_2$ | $MoSi_2$ | Reference sample |
| $(Mo_{0.88}Cr_{0.12})Si_2$ | Cr12 | Comparable samples |
| $(Mo_{0.87}Cr_{0.13})Si_2$ | Cr13 | |
| $(Mo_{0.86}Cr_{0.14})Si_2$ | Cr14 | |
| $(Mo_{0.85}Cr_{0.15})Si_2$ | Cr15 | |
| $(Mo_{0.80}Cr_{0.20})Si_2$ | Cr20 | |
| $(Mo_{0.84}Cr_{0.16})Si_2$ | Cr16 | Samples according to the present disclosure |
| $(Mo_{0.83}Cr_{0.17})Si_2$ | Cr17 | |
| $(Mo_{0.82}Cr_{0.18})Si_2$ | Cr18 | |
| $(Mo_{0.81}Cr_{0.19})Si_2$ | Cr19 | |

Figure 2:
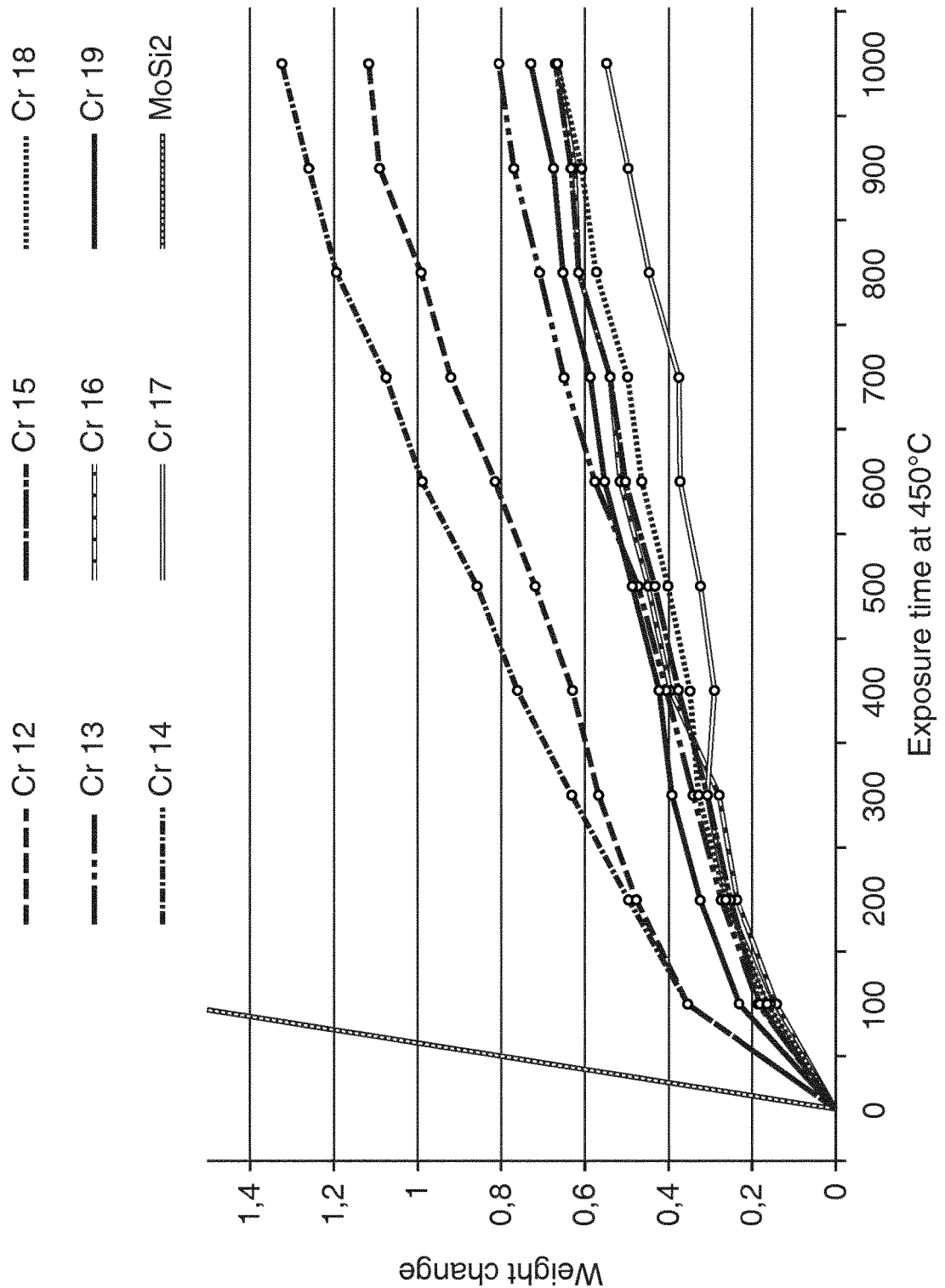
FIG. 2 shows a graph illustrating the weight gain as a function of exposure time at 450° C.
Figure 3:
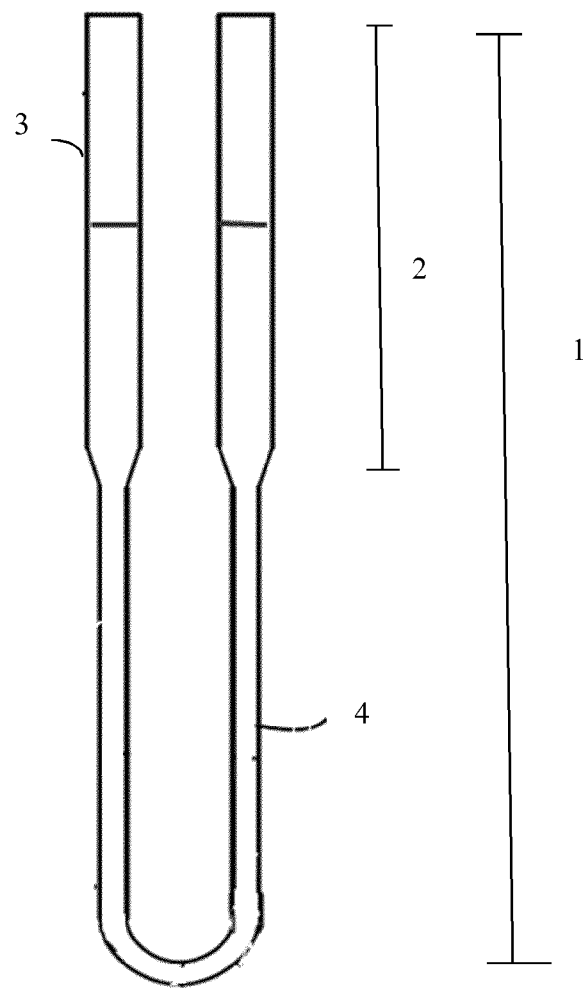
FIG. 3 illustrates a heating element according to one embodiment of the present disclosure.

FIGS. 1 and 2 show the surprising and positive effects of substituting molybdenum with chromium in amounts according to the present disclosure. The FIGS. 1 and 2 plot the weight change of the samples as a function of exposure time at a temperature of 450° C. in air for samples prepared according to the present disclosure compared to pure $MoSi_2$ and compositions having both higher and lower amounts of chromium than compositions according to the present disclosure. It is surprisingly shown in FIG. 1 that the optimum amount of chromium according to the disclosure is x=0.17. As can be seen from the figures, substitution with chromium in the amount of $0.16 \leq x \leq 0.19$ has a positive effect on the oxidation resistance. The positive effect of substituting Mo with Cr in the range of $0.16 \leq x \leq 0.19$, is therefore clearly demonstrated in FIGS. 1 and 2.

Example 2

Mixtures of molybdenum, silicon and chromium powders were prepared and heated in Ar to form $MoSi_2$ and $Mo_{0.85}Cr_{0.15}Si_2$, respectively. The reaction products were milled to an average particle diameter of 5 μm. Silicide powder was subsequently mixed with 5 wt. % bentonite (bentolite L) and water to form a paste for extrusion. Respective composition was extruded into 9 mm diameter rods, which were subsequently dried and pre-sintered in hydrogen for 1 h at 1375° C. Final sintering to achieve full density was then performed by resistance heating in air to 1500° C. for 5 minutes.

Samples of each composition were ground to remove the protective $SiO_2$ scale that was formed during final sintering. Samples were placed individually on alumina sample holders to collect potential oxidation products and include them in the weight measurements. The samples were placed in laboratory air in an electrical furnace heated to 450° C. employing FeCrAl heating elements and utilized with ceramic fiber insulation. Sample and holder were weighted to monitor individual weight changes as function of exposure time.

The combination $(Mo,Cr)Si_2$-based terminal portions on $MoSi_2$-based portions together with $MoSi_2$-based heating zone material displayed significantly improved resistance.

The invention claimed is:

1. A heating element composed of at least two molybdenum disilicide-based parts,
   wherein at least one part is based on a molybdenum disilicide composition comprising more than 90 weight % of $(Mo_{1-x}Cr_x)Si_2$ and wherein x is in the range of $0.16 \leq x \leq 0.19$; and
   wherein at least one part is based on a molybdenum disilicide composition comprising
   a) more than or equal to 90 weight % $MoSi_2$ balance is aluminosilicate and/or $SiO_2$
   or
   b) more than or equal to 90 weight % $(Mo,W)Si_2$ balance is aluminosilicate and/or $SiO_2$.

2. The heating element according to claim 1, wherein x is in the range of $0.16 \leq x \leq 0.18$.

3. The heating element according to claim 1, wherein x is in the range of $0.165 \leq x \leq 0.175$.

4. The heating element according to claim 1, wherein the molybdenum disilicide is substituted by chromium comprises from 95 weight % $(Mo_{1-x}Cr_x)Si_2$.

5. The heating element according to claim 1, wherein the composition of molybdenum disilicide is substituted by chromium has a balance of aluminosilicate and/or $SiO_2$.

6. The heating element according to claim 1, wherein an entirety of the heating element consists of the molybdenum disilicide composition.

7. The heating element according to claim 1, wherein the heating element consists of two parts.

8. The heating element according to claim 1, wherein the heating element consists of three molybdenum disilicide-based parts wherein two parts of the heating element are based on the same molybdenum disilicide-based composition and one part of the heating element is based on a different molybdenum disilicide-based composition.

9. Use of a heating element according to claim 1 in a furnace.

10. A furnace comprising a heating element according to claim 1.

* * * * *